INVENTORS
CARL M. TARTER
WALTER J. WALKER
BY
ATTORNEY

United States Patent Office 3,487,823
Patented Jan. 6, 1970

3,487,823
COMPOSITE VALVE SEAT INSERT AND METHOD OF OVERHAUL
Carl M. Tarter, 3275 Wallace Creek Road, and Walter J. Walker, 5774 W. Dry Creek Road, both of Healdsburg, Calif. 95448
Filed July 31, 1967, Ser. No. 657,228
Int. Cl. F01l *3/02, 3/22;* B21k *1/20*
U.S. Cl. 123—193                3 Claims

ABSTRACT OF THE DISCLOSURE

A valve seat insert for internal combustion engine is formed of two concentric rings, the outer ring being of the same coefficient of expansion as the cylinder head or block in which the insert is installed and the inner ring of a different coefficient of expansion and preferably of a hard material of a type conventionally used for valve seat inserts. A shelf or step is formed on the outer ring to match a similar step on the inner ring, or other interfitting portions are formed on the two portions to maintain in position relative to each other. The construction of the insert is such that it remains tight in the head or block whether the latter is hot or cold and eliminates the tendency for an air gap to form between the insert and the block or head.

---

Figure 1:
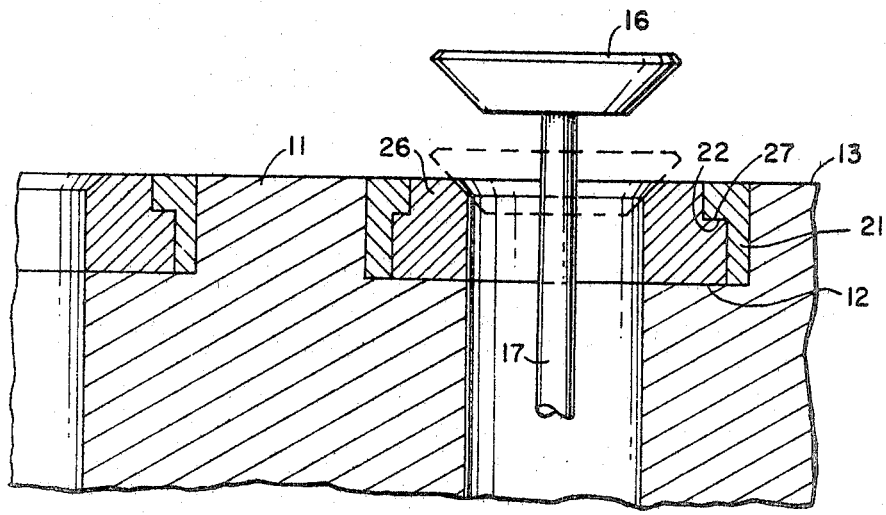

Conventional practice where valve seats are used in engines is to counterbore the head or block to accommodate the insert and then install an insert of a hard material which has a coefficient of expansion different from the soft material of which the head or block is made. Because of the difference in material, the head or block tends to expand in the diameter of the counterbore when the engine is hot to a greater degree than the expansion of the insert and this creates a gap between the outside diameter of the insert and the counterbore. A principal feature of the present invention is the elimination of such gap.

One of the dangers of the creation of the gap heretofore mentioned, which occurs in conventional insert construction, is that the insert may turn relative to the head or block and may even actually fall out of the counterbore. The elimination of the resulting damage is one of the principal advantages of the present invention.

Another undesirable feature of the creation of the gap between the insert and the head which exists in conventional engine construction is that the gap reduces the heat transfer between the insert and the head. It will be understood that the head or block in an air-cooled engine is usually provided with fins or registers to dissipate heat. When there is no conduction of heat between the insert and the block, the heat at the insert is not conducted to the block for dissipation, resulting in burning of the valve and the valve insert. A second principal advantage of the present invention is the elimination of burning of valves and valve inserts in the aforementioned manner.

A still further advantage of the present invention is the improvement in heat transfer from the valve seat to the block or head which allows the engine to run for longer periods of time without the hazard of a valve burning or loosening.

A still further feature of the invention is the provision of steps in the inner and outer rings of the insert which tend to prevent the parts from separating and also improve the transfer of heat to the inner ring and outer ring of the insert.

A still further feature of the invention is the facility with which the parts may be fabricated and with which they may be installed either as initial equipment or as replacements for burned valve seats of reconditioned engines.

Other objects of the present invention will become apparent upon reading the following specification and referring to the accompanying drawings in which similar characters of reference represent corresponding parts in each of the several views.

In the drawings:

FIG. 1 is a fragmentary sectional view of a valve seat insert and valve in accordance with the present invention and a portion of an adjacent valve seat.

Figure 2:
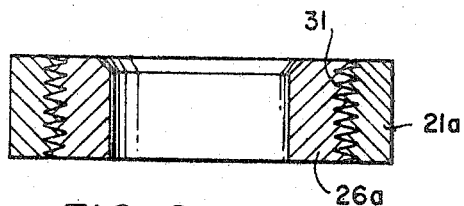
Figure 3:
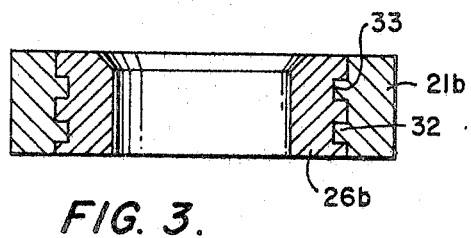
Figure 4:
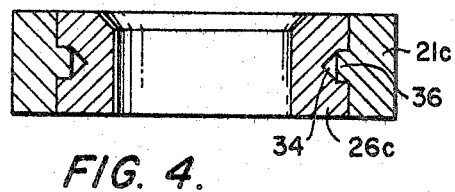

FIGS. 2 to 4, respectively, are fragmentary enlarged sectional views of alternate structures for securing the two parts of the insert together.

In the accompanying drawings, 11 represents a cylinder block or cylinder head, more particularly of the type used in air-cooled engines wherein fins or registers (not shown) dissipate the heat to the atmosphere. The block 11 may be of an aluminum alloy of the type commonly used in such internal combustion engine parts. It is a feature of such materials that the coefficient of thermal expansion thereof is high as compared with the alloys used in valve inserts. To accommodate the valve insert hereinafter described, a counterbore 12 of cylindrical shape is formed in the top surface 13 concentric with the valve passageway 14. A poppet valve 16, which is conical in shape, moves between open (full line) position and closed (dotted line) position upon movement of the stem 17 to which it is attached and which is concentric with passage 14. The counterbore 12 may be initially formed in the block or head 11 or may be formed during an engine overhaul to a greater diameter and/or depth.

Particularly when the valve 16 is an exhaust valve, severe heat subjects the insert which is installed in the counterbore 12 to high temperature conditions which may exceed the limits of endurance of the insert, causing the same to "burn" or "warp." Warping or excessive oxidation of the insert may cause the valve to leak or to stick. Further, heat conditions may be transmitted to the valve itself, causing burning or warping of the valve.

In accordance with the present invention, the valve insert which fits into the cylindrical counterbore comprises an outer ring 21 formed of a material which is identical to that of the head or block 11, or which at least has substantially the same coefficient of thermal expansion. The outside diameter of ring 21 is such that it fits into the inside diameter of the bore 12 with a force fit. In the form of the invention shown in FIG. 1, the shape of ring 21 is such that a horizontal step 22 is formed on the inside diameter thereof. It will be noted that the distance from the bottom of ring 21 to the step 22 may be about twice the distance between the step 22 and the top of ring 21. Further, the thickness of the ring 21 above step 22 may be approximately three times that of the thickness below the step.

The second member of the composite valve insert is an inner ring 26 which is formed with a stem 27 complementary to the step 22. A 45° chamfer 28 is formed on the upper end of the internal diameter of ring 26, assuming that the angle of the conical valve 16 is also 45°. The internal diameter of ring 26 is substantially the same as valve passage 14. Ring 26 may be formed of a material conventionally used in valve insert construction, namely, a hard heat resistant material such as ductile iron No. 80–60–03. Such material has a lesser coefficient of expansion than ring 21. It will be further noted that the mass of ring 26 is substantially greater than that of ring 21. The two parts 21 and 26 are force-fit together and the outside diameter of ring 21 is then turned to proper size and concentricity.

When the engine is hot the ring 21, being of the same coefficient of expansion as block 11, expands at the same rate. The inner ring 26 expands at about half the rate of the outer ring 21 and this requires that the outer ring be distorted inwardly, reducing any gap which might otherwise occur between the two rings. Reduction of this gap causes better heat conduction between the ring and the block 11. One of the conditions under which valves fail to a marked degree occurs when the engine is turned off and heat dissipation through the cooling fins is thereby reduced. The temperature of the head or block rises because of the reduction in dissipation to the atmosphere and if there is an air gap between the valve insert and the block or head there is a greatly reduced reduction in the dissipation of heat from the insert, causing it to warp or oxidize. If the valve is closed at this particular time, similar warpage and oxidation of the valve occurs. The present invention reduces the gap between the insert and the head or block thereby causing the heat to be dissipated from the valve insert at a greater rate than would otherwise occur.

The steps 22–27 prevent separation of the two rings 21 and 26. Further, because of the fact that there is a greater mass to the insert 26 below the step 22 than above the same relative to the outer ring 21, contact between the two parts of the insert is insured either above or below the step despite the operating conditions and temperatures to which the valve insert is subjected.

The method of reconditioning engines in accordance with this invention is as follows:

The counterbore 12 is formed in the head or block 11 by the use of a valve reboring tool of the general type conventionally employed. The counterbore 12 may be deeper and/or of greater diameter than the initial bore of the engine as produced at the factory. The composite insert consisting of rings 21, 26 has been prefabricated and force-fit together. When the composite insert is installed as indicated in FIG. 1, the rings remain in place relative to the head or block 11 and also relative to each other. When the valve is heated during operations of the engine, the ring 21 expands at the same rate as the block of head 11 but the ring 26 expands at a lesser rate. Hence the gap or clearance is reduced to about 0.0015 when the engine is hot.

FIG. 2 shows an alternate insert construction. Inner ring 26a is formed with external threads 31 or other grooves machined or cast on the outside thereof. The outer ring 21a is cast around ring 26a to fill threads 31 and, if necessary, turned to size to fit counterbore 12.

FIG. 3 shows external grooves 32 in inner ring 26b which are filled by complementary internal beads 33 or external ring 21b.

FIG. 4 shows a series of circumferentially spaced holes 34 drilled or otherwise formed on the exterior of ring 26c. Outer ring 21c is cast around the inner ring and protuberances 36 thereof fill holes 34.

The means shown in FIGS. 2–4 are alternate means for maintaining the two parts of the insert together despite substantial temperature changes and the difference in thermal expansion of the components.

What is claimed is:

1. In combination, an engine part of the class of heads and blocks of a material of a first coefficient of thermal expansion formed with a bore and a valve insert for installation in said bore comprising an outer ring of a first material having a coefficient of about the same as said first coefficient and a concentric inner ring of hard material of a lesser coefficient of expansion, said rings being discrete relative to each other, said inner ring extending from top to bottom of said insert, said rings intimately engaging each other and maintaining heat transferring contact over an extreme range of temperatures, both said rings being continuous throughout their circumferences, said inner and outer rings being assembled in relation to each other prior to installation in said head or block, said outer ring fitting tightly in said bore when said head or block is cold and being in intimate heat transferring contact with said bore when said head or block is hot and said outer ring fitting tightly in said bore when it is hot.

2. The combination of claim 1, in which said rings are formed with complementary steps restraining axial displacement of said rings in at least one direction.

3. A method of engine valve insert overhaul comprising reboring the head or block in a cylindrical bore and then fitting into said bore a composite valve insert, said insert comprising an inner metallic ring and an outer metallic ring, said rings being discrete relative to each other, said inner ring extending from top to bottom of said insert, said outer ring being of about the same coefficient of thermal expansion as said head or block, said inner ring being of a hard, heat-resistant material of lesser coefficient than said outer ring, said outer ring being in intimate, heat transferring contact with said bore when said head or block is either hot or cold and also being in intimate heat transferring contact with said inner ring both when said insert is hot or cold.

References Cited

UNITED STATES PATENTS

| | | | |
|---|---|---|---|
| 1,709,807 | 4/1929 | Purnis | 251—367 |
| 1,959,068 | 5/1934 | Stoll. | |
| 2,753,859 | 7/1956 | Bartlett. | |
| 1,770,112 | 7/1930 | Smith. | |
| 1,949,613 | 3/1934 | McDonald. | |
| 1,949,614 | 3/1934 | McDonald. | |
| 2,406,963 | 9/1946 | Norton. | |
| 2,424,738 | 7/1947 | Bronander. | |
| 2,447,858 | 8/1948 | Hoern. | |
| 3,115,127 | 12/1963 | Spencer et al. | |

AL LAWRENCE SMITH, Primary Examiner

U.S. Cl. X.R.

29—156.7; 123—188; 251—359, 367